3,740,422
POLYETHYLENIMINE HAIR AND SCALP RINSE
Gordon Trent Hewitt, Upper Montclair, N.J., assignor to Colgate-Palmolive Company, New York, N.Y.
No Drawing. Filed May 25, 1970, Ser. No. 41,158
Int. Cl. A01n 9/22; A61l 23/00
U.S. Cl. 424—78                                     5 Claims

ABSTRACT OF THE DISCLOSURE
A novel scalp rinse (aqueous or aqueous-alcoholic system) containing solubilized polyethylenimine polymers.

---

The present invention is drawn to a novel scalp rinse containing polyethylenimine as an effective agent against *Pityrosporum ovale*.

Dandruff is caused by the periodic sloughing off of skin which accumulates on the scalp and which in the presence of natural oils exuded by the scalp provides a suitable environment for the growth of *Pityrosporum ovale*, the fungus believed to be associated with dandruff. Polyethylenimine has been found to be effective against *P. ovale* and substantive to the scalp.

It is an object of this invention to provide a scalp rinse capable of exhibiting substantive antimicrobial properties.

It is a further object of this invention to provide a scalp rinse containing an active amount of polyethylenimine in a compatible nontoxic vehicle.

The polyethylenimine polymers which can be used in the scalp rinse of this invention can be prepared by polymerizing ethylene imine in the presence of a catalyst such as carbon dioxide, sodium bisulfite, sulfuric acid, hydrogen peroxide, hydrochloric acid, acetic acid, etc. Specific methods of preparation are described in U.S. Pat. Nos. 2,182,306, Ulrich et al., granted Dec. 5, 1939; 3,033,746, Moyle et al., granted May 8, 1962; 2,208,095; Esselmann et al., granted July 16, 1940; 2,806,839, Crowther, granted Sept. 17, 1957; and 2,553,696, Wilson, granted May 21, 1951.

Similarly, alkoxylated polyethylenimine can be prepared, for example, by reacting one part by weight ethylene oxide or propylene oxide with one part by weight polyethylenimine prepared as described above and having a molecular weight greater than about 1,800. Preferably the weight ratio of polyethylenimine to alkylene oxide is at least about 1:1, but ratios as low as about 1:4 are acceptable.

It is believed that the general structure of the polymer is:

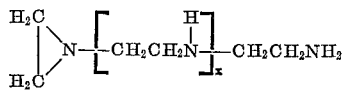

where $x$ represents a whole number of sufficient magnitude to yield a polymer of molecular weight greater than about 1800. Generally, $x$ may vary from 14 to about 1500 and preferably $x$ is from 45 to 500.

The polymers suitable for use in this invention have viscosities (in 1 percent by weight aqueous solutions) ranging from about 1.0 to about 3.0 centipoises (absolute viscosity) when measured by an Ostwald viscometer at 100° F. The molecular weight of the polyethylenimine polymers includes the entire range of dermatologically-safe materials. The preferred polymers have an average molecular weight within the range of about 1800 to about 200,000 with the most preferred polymer having an average molecular weight of about 100,000. The molecular weight may range as high as 500,000 for ethoxylated and propoxylated polymers.

The concentration of the polymer varies from about 0.5 to about 5.0 percent by weight of the total composition, preferably about 2.5 percent. The compatible nontoxic vehicle is usually water; however, when an aqueous-alcoholic system is used, the alcohol is present in an amount from about 0.1 to 70 percent by weight of the total composition, preferably from about 10 to about 20 percent. The lower alcohols containing from 2 to 3 carbon atoms such as ethanol, propanol, and isopropanol are generally preferred. The pH of the resultant rinse compositions is generally in the range of about 3 to 9 and preferably about 6 to 7.5; however, the pH is not a significant variable.

The rinse is prepared having a 0.5- to 5.0-percent concentration of polyethylenimine and is then diluted about 5 times with water to form the actual rinse used on the scalp. Thus the amount of polyethylenimine applied to the scalp is about 0.1 to 1 percent. Amounts of PEI in excess of 1 percent do not produce results any better than 1-percent PEI; however, greater amounts of PEI may be used. Thus, the concentrate of this invention may contain amounts of PEI in excess of 5.0 percent, if desired.

It is very surprising that polyethylenimine is effective in inhibiting the growth of *P. ovale* since it shows almost no general antimicrobial properties. It was tested on our standard set of eight bacteria and found to be ineffective against *S. aureus* (MIC greater than 500 µg./ml.), *Str. mitis* (MIC greater than 500 µg./ml.), *E. coli* (MIC greater than 1000 µg./ml.), *Ps. aeruginosa* (MIC greater than 1000 µg./ml.), *C. albicans* (MIC about 1000 µg./ml.), and *A. niger* (MIC greater than 1000 µg./ml.); only moderately effective against *T. mentagrophytes* (MIC about 500 µg./ml.); but very effective against *P. ovale* (MIC of 3.9 µg./ml.). Moreover, polyethylenimine is highly substantive to proteinaceous material.

EXAMPLE I
An aqueous scalp rinse is prepared having the following composition:

|  | Percent by weight |
|---|---|
| Polyethylenimine (M.W. 1,800) | 0.5 |
| Water | 99.5 |

EXAMPLE II
An aqueous-ethanolic scalp rinse is prepared having the following composition:

|  | Percent by weight |
|---|---|
| Polyethylenimine (M.W. 100,000) | 0.5 |
| Ethanol | 10.0 |
| Water | 89.5 |

These scalp rinses may be used either before or after shampooing the hair, preferably after shampooing. The composition is diluted with water, poured over the hair, washed into the hair, and then preferably rinsed out. However, the rinsing step may be omitted.

Conventional scalp rinse additives such as perfumes, coloring agents, thickeners, emulsifiers, stabilizers, preservatives, antioxidants, antimicrobial agents, etc. may be added to the instant composition and are within the scope of this invention.

Non-anionic surfactants may be included in the compositions of this invention to provide increased penetration and a more even or uniform distribution of the polyethylenimine polymer on the hair; however, such an embodiment is nonpreferred. Suitable surfactants include the nonionics, such as the condensation products of ethylene oxide with the $C_6$–$C_{12}$ alkyl phenols, $C_{10}$–$C_{18}$ alkanols, or $C_8$–$C_{18}$ fatty acids (for example, isooctyl phenol with 6 to 30 ethylene oxide units); cationics, such as the $C_8$–$C_{18}$ mono- and di- higher alkyl quaternary ammonium compounds (for example, dodecyl dimethyl benzyl ammonium chloride); zwitterionics, such as the betaines and sulfo betaines containing a $C_8$–$C_{18}$ alkyl group (for example, coco dimethyl betaine); ampholytic long chain ($C_8$–$C_{18}$ alkyl) imidazoline derivatives shown in U.S. 2,528,378 and U.S. 2,773,068, and semi-polar trialkyl amine oxides containing a $C_8$–$C_{18}$ alkyl group (for example, dodecyl dimethyl amine oxide).

Anionic detergents may not be used since they complex with PEI to destroy its antimicrobial characteristics.

Percentage values employed in the specification and claims refer to percent by weight of the total composition unless otherwise stated.

The non-anionic detergent may be present in an amount of about 0.1 to 3.0 percent by weight.

What is claimed is:

1. A method of combating *Pityrosporum ovale* on the hair and scalp of humans comprising applying to the hair and scalp of humans in the presence of water an effective amount of a composition suitable as a scalp rinse before or after shampooing and containing solubilized polyethylenimine, said composition consisting essentially of about .05 to about 5% by weight of a water-soluble polyethylenimine polymer selected from the group consisting of polyethylenimine having a molecular weight from about 1,800 to about 200,000 and the reaction product of said polyethylenimine with either ethylene oxide or propylene oxide in a weight ratio of polyethylenimine to alkylene oxide of at least 1:4, said reaction product having a molecular weight of up to 500,000, solubilized in a compatible, nontoxic, aqueous vehicle, said composition being free of anionic detergent.

2. A method in accordance with claim 1 wherein said polymer is polyethylenimine having a molecular weight of from about 1,800 to about 200,000 and said vehicle is water.

3. A method in accordance with claim 1 in which said vehicle is an aqueous-alcoholic solution containing about 0.1 to 70% by weight of a $C_2$–$C_3$ lower alcohol, said weight being based upon the total weight of the composition.

4. A scalp rinse composition effective against *Pityrosporum ovale* for use before or after shampooing which consists essentially of about .05 to about 5% by weight of a solubilized, water-soluble, polyethylenimine polymer, said polymer being selected from the group consisting of polyethylenimine having a molecular weight from about 1,800 to about 200,000 and the reaction product of said polyethylenimine with either ethylene oxide or propylene oxide in a weight ratio of polyethylenimine to alkylene oxide of at least 1:4, said reaction product having a molecular weight of up to 500,000, solubilized in an aqueous alcoholic solution containing from about 0.1 to about 70% by weight of a compatible, nontoxic $C_2$–$C_3$ alcohol, said composition being free of anionic detergent and having a pH of about 3 to 9.

5. A method of inhibiting the growth of *Pityrosporum ovale* comprising applying to a substrate containing *Pityrosporum ovale* an effective amount of a composition consisting essentially of about .05 to about 5% by weight of a solubilized, water-soluble polymer selected from the group consisting of polyethylenimine having a molecular weight of about 1,800 to about 200,000 and the reaction product of said polyethylenimine with either ethylene oxide or propylene oxide in a weight ratio of polyethylenimine to alkylene oxide of at least 1:4, said reaction product having a molecular weight of up to 500,000, solubilized in a compatible, nontoxic, aqueous vehicle, said composition being free of anionic detergent and said polymer being effective against *Pityrosporum ovale*.

References Cited

UNITED STATES PATENTS

| 3,033,746 | 5/1962 | Moyle et al. | 424—325 |
| 3,280,179 | 10/1966 | Ernst | 424—70 X |

FOREIGN PATENTS

| 451,412 | 2/1968 | Switzerland | 424—316 |
| 1,111,708 | 5/1968 | Great Britain | 424—325 |
| 1,078,075 | 8/1967 | Great Britain. | |

ALBERT T. MEYERS, Primary Examiner

V. C. CLARKE, Assistant Examiner

U.S. Cl. X.R.

252—106; 260—29.2 N; 424—DIG. 2, DIG. 4, 10